United States Patent [19]
Berg et al.

[11] Patent Number: 4,756,577
[45] Date of Patent: Jul. 12, 1988

[54] LOCK MECHANISM FOR A CAR SEAT BACK AND RECLINER

[75] Inventors: Alan D. Berg, Oxford; Juozas Doveinis, Sterling Heights, both of Mich.

[73] Assignee: General Motors Corporation, Detroit, Mich.

[21] Appl. No.: 37,429

[22] Filed: Apr. 13, 1987

[51] Int. Cl.⁴ .............................................. B60N 1/04
[52] U.S. Cl. ................................... 297/379; 297/355
[58] Field of Search ............... 297/379, 355, 374, 376

[56] References Cited

U.S. PATENT DOCUMENTS

| | | | |
|---|---|---|---|
| 3,744,844 | 7/1973 | Nomaki et al. | 257/355 |
| 4,296,966 | 10/1981 | Terda | 297/355 X |
| 4,318,569 | 3/1982 | Bilenchi | 297/379 |
| 4,484,779 | 11/1984 | Suzuki | 297/379 X |
| 4,606,577 | 8/1986 | Hirama et al. | 297/379 X |
| 4,629,250 | 12/1986 | Tezuka et al. | 297/379 X |
| 4,629,252 | 12/1986 | Myers et al. | 297/379 |
| 4,634,180 | 1/1967 | Zaueri et al. | 257/379 |
| 4,687,252 | 8/1987 | Bell et al. | 297/374 |

Primary Examiner—Peter A. Aschenbrenner
Attorney, Agent, or Firm—William A. Schuetz

[57] ABSTRACT

A lock mechanism for releasably locking a back rest of a vehicle seat assembly in either its normal upright position, a forward folded position or a rearward reclined position. The lock mechanism is located wholly within the seat area, is of a narrow width construction and functions to releasably detent the seat back in either of its normal upright position or forward folded position. It is also operable to allow rearward movement to a reclined position while detented in its normal upright position and to automatically return the seat back from a reclined position to its normal upright position. An inertia lock pendulum is provided to prevent movement of the seat back from any of its positions when the seat assembly is subjected to rapid deceleration forces.

7 Claims, 3 Drawing Sheets

LOCK MECHANISM FOR A CAR SEAT BACK AND RECLINER

The present invention broadly relates to a vehicle seat assembly and, more particularly, to a novel lock mechanism for a vehicle seat back and recliner for releasably locking or detenting the seat back in either its normal upright position or a forward folded position and for allowing movement between a rearward reclined position and its upright positon while remaining detented in its upright position.

A broad object of the present invention is to provide a new and improved lock mechanism for releasably locking a seat back of a vehicle seat assembly in either its normal upright position or a forward folded position, but which allows movement to a rearward reclined position while remaining releasably locked or detented in its upright position and in which the lock mechanism is of a simple and inexpensive construction, takes up only a minimal amount of space, is wholly located within the seat area of the seat assembly and has a narrow width side hinge arm means connectable with the seat back so as to improve the appearance or aesthetics of the seat back.

Another object of the present invention is to provide a new and improved lock mechanism for a seat assembly having a seat and a back rest which has a narrow width side hinge arm means pivotally supported by the seat to enable the seat back to moved between a normal upright position and a forward folded position or between a normal upright position and a rearward reclined position and in which the lock mechanism is located within the seat area and is operable to releasably lock the seat back in either of its upright or folded positions, and wherein the lock mechanism includes a support bracket secured to the seat, a first lever pivotally supported by the seat bracket via a main pivot means and with the latter also pivotally supporting the hinge arm means of the back rest and wherein the hinge arm means at its lower ends has first and second arcuately spaced recesses for receiving a roller pivotally connected to a detent lever, the detent lever in turn being pivotally connected to the first lever, a second lever pivotally connected to the first lever at one end and its other end engageable with the detent lever at its end remote from the roller means, spring means carried by the pivot means for biasing the second lever into engagement with the other end of the detent lever to biasing retain the roller means in engagement with the lower end of the hinge arm and within either the first or second recesses when the roller means is located adjacent thereto and recliner biasing means operatively connected with the first lever at its end remote from the main pivot means for biasing the back rest towards its normal upright position, and wherein the lower end of the hinge arm means when the latter is being moved between its normal upright and forward folded positions respectively causing the detent lever and second lever to be rotated in a direction in opposition to the biasing force of the spring means, and wherein the first lever, hinge arm, second lever and detent lever are rotatable in unison about the main pivot means in response to pushing backward movement on the back rest to a reclined position from its normal upright position in opposition to the biasing force of the recliner biasing means and with the latter functioning to return the back rest from a reclined position towards its normal upright position when the back rest is released and to biasingly hold the detent roller in the first recess and in engagement with the hinge arm to prevent rattling between the roller and the hinge arm when the seat back rest is in its normal upright position.

Yet another object of the present invention is to provide a new and improved lock mechanism, as defined in the next preceding object, and wherein the hinge arm means, the lock mechanism support bracket, first lever, detent lever and second lever are all made from stamped, generally planar metal parts whereby the entire locking mechanism can be packaged in a relatively narrow width space and can be made and assembled inexpensively.

A further object of the present invention is to provide a new and improved lock mechanism, as defined in any of the preceding objects, and wherein the lock mechanism also includes an inertia lock pendulum for locking the seat back rest in any of its positions upon the vehicle being subject to rapid deceleration forces, the locking pendulum being pivotally supported by the first lever at one end and having its other end slidably disposed within a slot in the first lever at a location in which the pendulum thereof is disposed beneath the detent lever so as to prevent the detent lever from moving when the vehicle is subject to rapid deceleration forces.

The present invention further resides in various novel constructions and arrangement of parts, and further objects, novel characteristics and advantages of the present invention will be apparent to those skilled in the art to which it relates and from the following detailed description of the illustrated, preferred embodiment hereof made with reference to the accompanying drawings forming a part of this specification and in which similar reference numerals are employed to designate corresponding parts throughout the several views, and in which:

Figure 1:
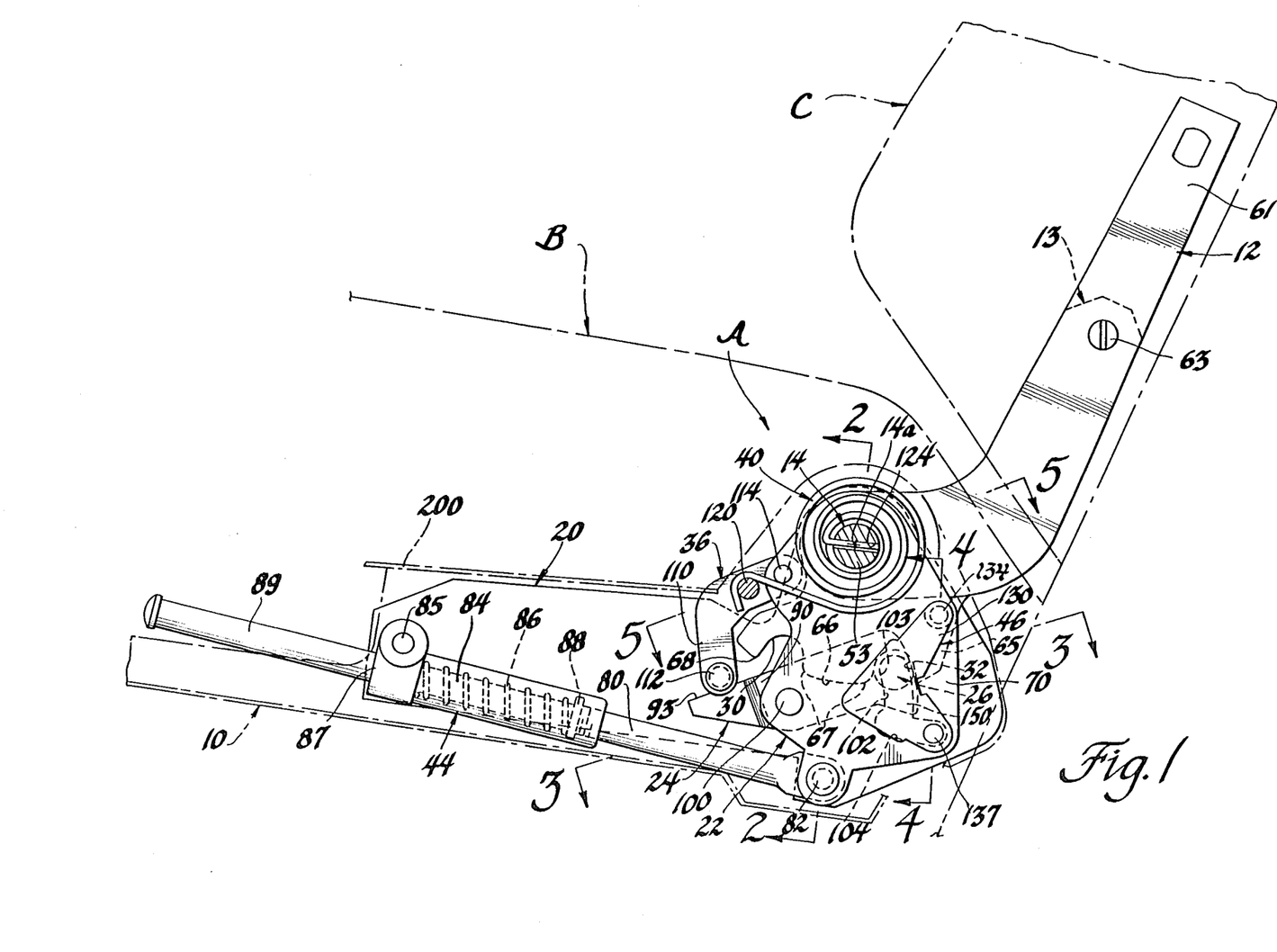
FIG. 1 is a fragmentary side elevational view of a seat assembly incorporating the novel locking mechanism of the present invention and with the parts of the seat assembly being shown in phantom and the seat back in its normal upright position.
Figure 7:
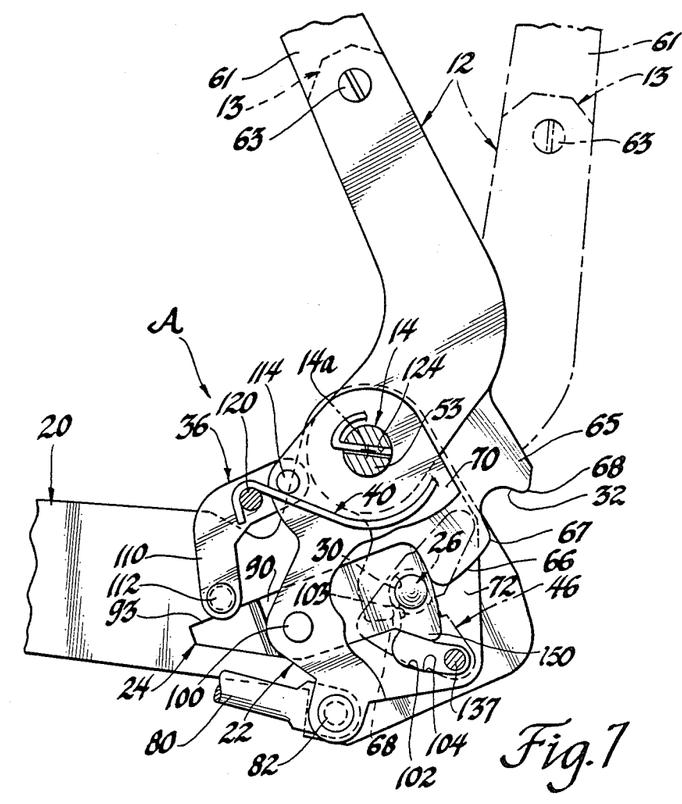
FIG. 7 is a fragmentary side elevational view like that shown in FIG. 1, but showing the relative positions of the parts when the hinge arm means of the seat back rest is in its forward folded position.
Figure 8:
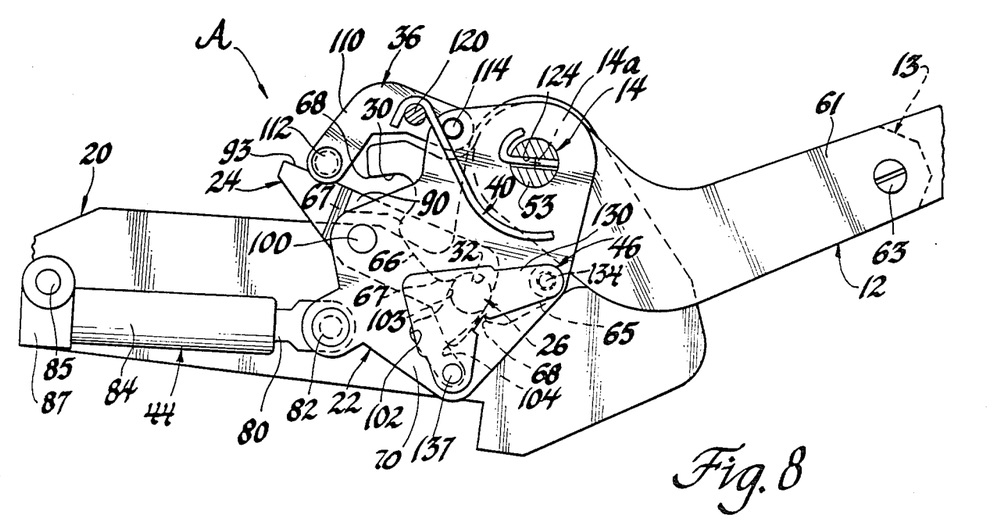
FIG. 8 is a view like that shown in FIG. 1, but showing the relative positions of the parts when the hinge arm means of the seat back rest is in a reclined position.

The present invention provides a novel lock or locking mechanism A for use with a vehicle seat assembly having a seat or seat unit B, a seat back or seat back and recliner unit C pivotally supported by the seat unit B for movement between a normal upright position, as shown in FIG. 1, a forward folded position, as shown in FIG. 7, or a rearward reclined position, as shown in FIG. 8, and in which the novel lock or locking mechanism A is operable to releasably lock the back rest C in either of its upright or folded positions.

The seat unit B, as shown in phantom lines in FIG. 1, could be of any suitable or convention construction and includes a seat unit frame 10 which is adapted to be mounted to a vehicle floor. The back rest or back rest unit C could be of any suitable or conventional construction and includes a side support or hinge arm 12 suitably secured to the back rest C adjacent its upper end, as viewed in FIG. 1. The hinge arm 12 adjacent its lower end is rigidly connected to a pivotal hinge arm 13 of the locking mechanism A which is supported or carried by the seat unit B.

The locking mechanism A functions to pivotally support the back rest C for movement in both forward and rearward directions from its normal upright position as viewed in FIG. 1. The locking mechanism A also functions to releasably detent or retain the seat back C in either of its normal upright position, as shown in FIG. 1, or its forward folded position, as shown in FIG. 7, to allow movement of the seat back C to a rearward reclined position, as shown in FIG. 8, while remaining releasably detented in its upright position and it functions automatically lock the seat back rest C in either of its positions upon the vehicle being subjected to rapid deceleration forces above a predetermined magnitude.

The locking mechanism A comprises, in general, a bracket or support means 20 which is adapted to be secured to the seat frame means 10 adjacent one side of the seat B, a pivot means 14 which extends transversely of and is secured to the bracket 20, a first lever means 22 which is pivotally supported for movement in opposite directions by the pivot means 14, a detent lever or lever means 24 which is pivotally supported intermediate its ends by the first lever means 22 and which carries a roller or roller means 26 adjacent one end thereof which is adapted to be received within either of a pair of recesses 30 and 32 in the hinge arm 13 adjacent its lower end to releasably retain the seat back C in either its forward folded position or its normal upright position, respectively, a second lever 36 having one end pivotally supported by the first lever means 22 and its other end in engagement with the detent lever or lever means 24 at its end remote from the roller means 26, a spring biasing means 40 having one end secured to said pivot means 14 and its other end engageable with said second lever 36 to bias the latter into engagement with the detent lever means 24 and in turn bias the lever means 24 into engagement with the lower end of the hinge arm 13 so that the roller means 26 is received within one of the recesses 30 or 32, a recliner spring biasing means 44 operatively connected with the first lever means 22 for biasing the hinge arm 13 and back rest C towards its normal upright position, as shown in FIG. 1, but which allows the seat back rest C to be moved from its normal upright position toward a reclined position in opposition to its biasing means, and an inertia lock means or pendulum 46 which is pivotally supported by the first lever means 22 and which functions to move in the path of movement of said detent lever means 24 to prevent forward movement of said seat back unit C when the vehicle is being subjected to rapid deceleration forces in excess of a predetermined magnitude regardless of the three positions the seat back unit C is in at the time of such rapid deceleration forces.

Figures 2, 3, 5:
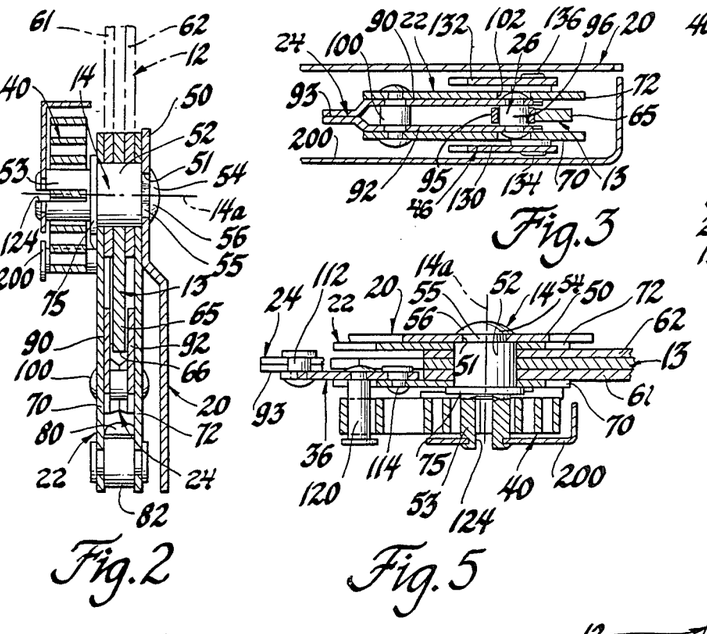
FIG. 2 is a fragmentary cross sectional view of part of the locking mechanism shown in FIG. 1 and taken along the lines 2—2 thereof.
FIG. 3 is a fragmentary sectional view of part of the locking mechanism shown in FIG. 1 and taken along the lines 3—3 thereof.
FIG. 5 is a fragmentary sectional view of part of the locking mechanism shown in FIG. 1 and taken along the lines 5—5 thereof.

The support bracket 20 for supporting the remainder of the locking mechanism A comprises a flat stamped sheet metal member, preferably steel, which is stamped to the configuration shown in FIG. 1 and which is adapted to be suitably bolted or otherwise secured to the seat support frame means 10 adjacent one side of the seat unit B. As best shown in FIG. 2, the bracket 20 is stamped so as to provide a laterally outwardly offset portion 50 adjacent its upper end and is provided with a non-circular shaped aperture 51. The upper end or offset portion 50 of the bracket 20 supports the pivot pin means 14. The pivot pin means 14 comprises a bushing 52 rotatably supported on a shank 53 of a pivot pin 54. The pivot pin 54 has a non-circular shank portion 55 adjacent its right end, as viewed in FIG. 2, which is non-rotatably received within the opening 51 of the offset portion 50 of the bracket 20. The pivot pin 54 is thus non-rotatably secured to the offset portion 50 of the bracket 20 by having the bracket 20 clamped between the bushing 52 and a peened over head 56 at the right end of the shank portion 55. The pivot pin means 14 extends transversely or perpendicular to the bracket 20 and the bushing 52 rotatably supports the hinge arm 13.

Figure 6:
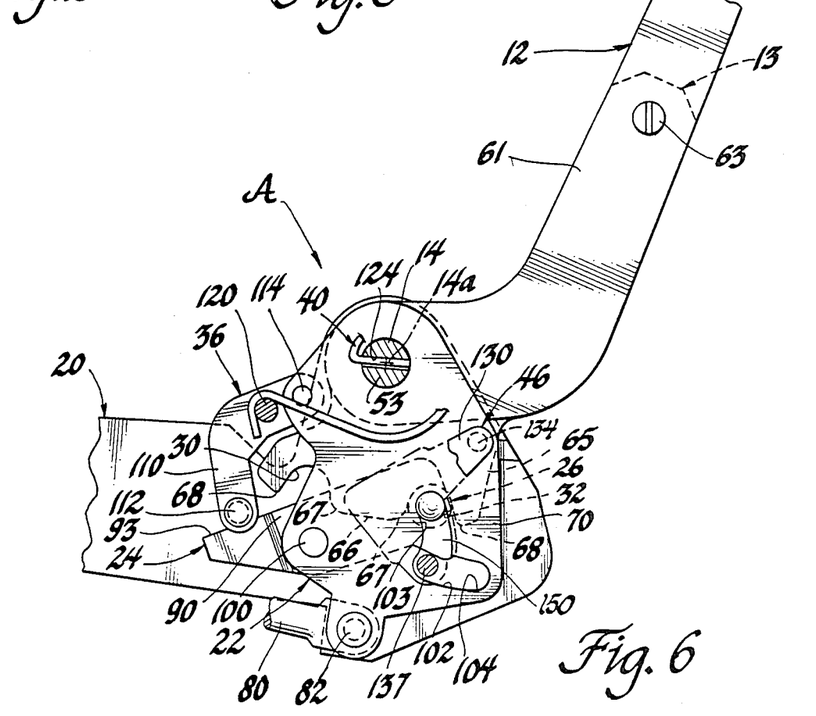
FIG. 6 is a fragmentary side elevational view of the locking mechanism shown in FIG. 1, but with the parts being shown in their relative positions when the seat back is in its normal upright position and is being subjected to rapid deceleration forces.

The hinge arm 12, as best shown in FIGS. 1 and 2, comprises a pair of spaced upper members 61 and 62 which are clamped to the opposite sides of the hinge arm 13 adjacent its upper end via any suitable means, such as by a fastener 63. The hinge arms 12 and 13 are stamped from sheet metal and when connected together present a narrow width profile. The lower hinge arm 13 intermediate its ends and the upper members 61 and 62 at their lower ends, as best shown in FIGS. 2 and 6, are rotatably or pivotally supported on the bushing 52 of the pivot means 14 for movement about its axis 14a in opposite directions. The lower hinge arm 13 has a lower end portion 65 disposed below the axis 14a of the pivot pin means 14 and has a lower arcuate surface 66 which is concentric with the axis 14a of the pivot pin means 14. The lower end 65 of the hinge arm 13 is provided with recesses 30 and 32 at spaced circumferentially extending locations which are open with and contiguous with the arcuate surface 66. The recesses 30 and 32 at their adjacent sides contiguous with the midportion of the arcuate surface 66 are smoothly radiused, as indicated by the reference numeral 67, and at their sides remote from each other are sharply radiused, as indicated by the reference numeral 68, and for reasons to be hereinafter more fully described.

The pivot pin means 14 also rotatably supports the first lever means 22 for pivotal movement in opposite directions about the axis 14a. The lever means 22, as best shown in FIGS. 1 and 2, comprises a pair of planar members 70 and 72 stamped from sheet steel to the peripheral configuration shown in FIG. 1. The planar members 70 and 72 of the lever means 22 are spaced from each other and with the lever member 72 being located between the offset portion 50 of the bracket 20 and the upper hinge arm member 62 and the lever member 70 being located on the outside of the hinge arm member 61. The hinge arm members 13, 61 and 62 and the lever members 70 and 72 are retained in their assembled relation, as shown in FIG. 2, by a collar 75 on the bushing 52. Alternatively, a C-shaped snap ring could be used in place of the collar 75. As best shown in FIGS. 1 and 6, the lever means 22 adjacent its upper end is pivotally connected to the pivot pin means 14 and at its lower end is pivotally connected to one end of a rod 80 of the recliner biasing means 44 by a pivot pin means 82. The pivot pin means 82 extends between the lever member 70 and 72 of the lever means 22 and the rod is connected thereto between the lever members 70 and 72.

The other end of the rod 80 of the recliner biasing means 44 extends through a cylindrical housing 84 which in turn is pivotally connected to the bracket 20 at its forward end or end remote from the seat back unit C by a suitable pivot pin means 85. The recliner biasing means 44 also includes a compression spring 86 having one end in abutting engagement with an end 87 of the housing 84 and its other end in abutting engagement with a stop 88 adjustably threadably secured to the rod 80 intermediate the ends of the latter. The spring 86 and stop 88 are wholly contained within the housing 84. The rod 80 extends through the housing 84 and has a forwardly extending end portion 89 which extends forwardly of the bracket 20, as viewed in FIG. 1. The compression spring 86 of the recliner biasing means 44 serves to move the rod 80 toward the right and bias the lever means 22 to a position in which the seat back unit C is in its normal upright position, but allows the lever means 22 to be rotated in a clockwise direction and the rod 80 toward the left in opposition to the biasing force of the spring 86 when the seat back rest C is moved toward a reclined position.

The lock mechanism A also includes the detent lever means 24 for detenting and releasably locking the seat back unit C in its normal upright position or forward folded position. As best shown in FIGS. 2 and 3, the detent lever means 24 comprises a pair of stamped sheet metal planar lever members 90 and 92 whose left end 93, as viewed in FIGS. 1 and 3, are offset and welded together, but which are otherwise spaced apart and extend parallel to each other. The levers 90 and 92 at their right end rotatably support therebetween the roller means 26. The roller means 26 comprises a roller 95 which is rotatably supported on a suitable pivot pin means 96 secured to the levers 90 and 92. The detent lever means 24 has its lever members 90 and 92 freely or slidably disposed between the lever members 70 and 72 of the first lever means 22. The lever members 90 and 92 are also pivotally connected intermediate their ends to the levers 70 and 72 via a pivot pin means 100. The detent lever means 24 is pivotally supported by the pivot pin means 100 for movement relative to the first lever means 22 in either direction. The levers 70 and 72 of the first lever means 22 are provided with aligned slots 102. The slots 102 are generally L-shaped, as viewed in FIG. 1, so as to define an arcuate, generally vertically upwardly extending portion 103 and an arcuate, generally horizontally extending portion 104. The vertically extending portions 103 of the slots 102 freely receive the heads of the pivot pin means 96 so as to not interfere with any pivotal movement of the lever means 24.

The left end 93 of the lever means 24 is adapted to be engaged at all times by a lower end 110 of the lever means 36. The lever means 36 comprises a stamped sheet metal planar member whose lower end 110 carries a transversely extending pivot pin means 112 which engages the upper side of the end 93 of the lever means 24, as viewed in FIG. 1. The upper end of the lever means 36, as viewed in FIG. 1, is pivotally connected to the levers 90 and 92 of the lever means 22 via a suitable pivot pin means 114.

The lever means 36 is adapted to be biased for rotation about pivot pin means 114 in a counterclockwise direction, as viewed in FIG. 1, and the lever means 24 by virtue of the engagement between the end 110 of the lever means 36 with the end 93 of the lever means 24, is adapted to be biased for rotation in a counterclockwise direction about the pivot pin means 96 by the spring means 40. The spring means 40 is a coil steel spring which has one end suitably secured to the shank portion 53 of the pivot pin 53 of the pivot means 14 and its other end curled or looped around a pivot pin 120 carried by the lever means 36 intermediate its ends. As shown in FIG. 1, one end of the coil spring 40 could be received within a slot 124 of the shank portion 53 of the pivot pin 53. The coil spring 40 is wrapped so as to exert a biasing force in a counterclockwise direction on the pivot lever 36 which in turn biases the lever means 24 in a counterclockwise direction, which in turn biases the roller 26 carried at its opposite end of the lever means 24 into engagement with the arcuate surface 66 of the lower hinge arm 13.

Figure 4:
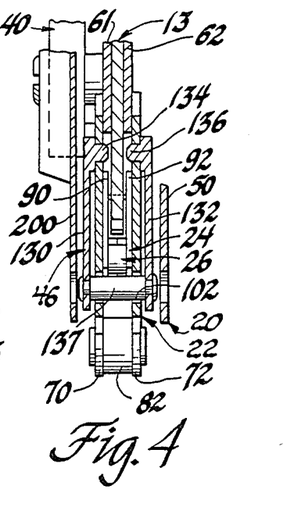
FIG. 4 is a fragmentary sectional view of part of the locking mechanism shown in FIG. 1 and taken along the lines 4—4 thereof.

The lock mechanism A also includes an inertia lock means or pendulum 46. The inertia lock means or pendulum comprises a pair of generally planar members 130 and 132 which are spaced apart at their upper ends and pivotally connected to the levers 70 and 72 of the first lever means 22 via integrally formed pivot pins 134 and 136. The members 130 and 132 at their lower ends are suitably connected to a weight 137 extending therebetween and which is disposed within the slot portion 104 of the slots 102 in the lever means 22. The levers 130 and 132 are disposed outside the lever 70 and 72 of the lever means 22, as viewed in FIG. 4, and the weight 137 is slidably movable within the arcuate slot portions 104, which slot portions are concentric about the pivot axis of the pivot pins 134 and 136. As best shown in FIG. 1, the slot portions 104 of the slots 102 adjacent their right ends are disposed out of the path of movement of the lever means 24 and at their left end portions are located beneath the path of movement of the right end of the lever means 24. Thus, when the inertia pendulum 46 is in the position shown in FIG. 1, the weight 137 thereof is located at the right end of the slots 104 by gravity. However, should the vehicle be subjected to rapid deceleration forces, the weight 137 thereof will shift toward the left to the position shown in FIG. 6 in which it is located beneath and disposed within the path of movement of a downwardly projecting portion 150 of the detent lever means 24 so as to prevent the latter from pivoting about the pivot means 100 and lock the entire lock mechanism A in place so as to prevent forward tilting movement of the hinge arms 12 and 13 and hence, the seat back rest C.

Operation of the locking mechanism A will now be described with reference to FIGS. 1 and 6-8 of the drawings. When the seat back rests C is in its normal upright position, the various parts of the locking mechanism A are in the position shown in FIG. 1. In this position, the roller 26 of the detent lever means 24 is received within the recess 32 of the lower hinge arm 13, the hinge arm means and back rest C in its normal upright position. The roller 26 is biasingly retained within the recess 32 by virtue of the second lever means 36 and the spring biasing means 40. The spring biasing means 40 biases the lever means 36 in a counterclockwise direction about its pivot means 114 which in turn causes the lever means 36 to engage the end 93 of the detent lever means 24 to bias it in the counterclockwise direction about its pivot means 100. Note that the detent lever means 24 cannot be pivoted in a clockwise direction about its pivot means 100 due to any camming action exerted on the roller means 26 by pushing rearwardly on the hinge arm 13 due to the fact that the shape of the side surface defining the recess 32 and the sharp radius 68 will prevent such camming action from taking place.

Forward or counterclockwise movement of the hinge arm 13 to enable the seat back rest C to be moved from its normal upright position, as shown in FIG. 1, to its forward folded position, as shown in FIG. 7, can take place by exerting a predetermined forward force on the back rest unit C. When the back rest unit C is moved from its normal upright position to its forward folded position, the lower end of the hinge arm 13 cams the detent roller 26 outwardly of its recess 32 which in turn causes the detent lever means 24 to be pivoted about its pivot 100 in a clockwise direction which in turn causes the second lever means 36 to be pivoted in a clockwise direction about its pivot means 114 in opposition to the biasing force of the spring 40. This camming movement is caused by virtue of the fact that the inner surface defining the recess 32 and the radius 67 is shaped such that this camming action or movement can take place. When the detent roller 26 clears the recess 32, and the hinge arm 13 is further rotated in a counterclockwise direction about the pivot means 14 the roller 26 will roll on the arcuate surface 66 until it is positioned adjacent the recess 30 whereupon the spring biasing means 40 will cause the second lever means 36 to be pivoted in a counterclockwise direction about its pivot means 114 which in turn will cause the lever means 24 to be pivoted in a counterclockwise direction about its pivot means 100 by virtue of the engagement of the lever means 36 with the end 93 of the detent lever means 24. When the detent roller means 26 is positioned within the recess 30, the seat back rest C is releasably locked in its forward folded position.

Likewise, the seat back rest can be readily moved from its forward folded position towards its normal upright position by exerting a predetermined force on the back rest unit C in a clockwise direction about the pivot means 14. When this force is exerted, the inner side defining the recess 30 will cam the detent roller 26 outwardly and in the same manner as heretofore described with connection of the inner side of the recess 32 camming the detent roller 26 outwardly when the back rest C was moved from its normal upright position to its forward folded position.

It should be noted that movement of the seat back rest C between its normal upright and forward folded positions has no effect on the position of the first lever means 22, the seat back recliner biasing means 44 and the inertia pendulum lock means 46 (see FIGS. 1 and 7). These parts at all times during these movements remain in their relative position shown in FIG. 1. Thus, the inertia lock pendulum has its weight 137 located in the rightmost end of the horizontally extending slot portions 104 so that it remains clear of any movement of the detent lever means 24 so as to enable the same to be pivoted about its axis 100.

The seat back rest C can also be moved from its normal upright position, as shown in FIG. 1, to a reclined position, as shown in FIG. 8. When the occupant of the seat desires to move the same to a reclined position, he will merely push back on the seat back unit C. This movement will cause the hinge arm 13 to pivot in a clockwise direction about the axis of the pivot means 14, as viewed in FIG. 1. Since the roller means 26 cannot be cammed out of its recess 32 by movement of the hinge arm 13 in a clockwise direction due to the shape of the outer side surface of the recess 32 and the sharp radius 68, the entire lock mechanism A except for the bracket 20 thereof will be caused to be pivotally moved. Thus, rearward pushing movement on the hinge arm 13 will cause the first lever means 22, the detent lever means 24, the second lever means 36 and inertia lock pendulum 46 to be moved clockwise in unison about the axis 14a of the pivot means 14 and with the parts thereof staying in the same relative positions, shown in FIGS. 1 and 8, with the exception that the coil spring 40 will be slightly more tightly wound. In addition, this unison clockwise pivoting movement of the various parts in the clockwise direction about the pivot means 14 will cause the rod 80 to slide within the housing 84 and compress the compression spring 86. Since the housing 84 is pivotally connected to the bracket means 20 via the pivot means 85, arcuate movement of the end of the rod due to the clockwise movement of the first lever means 22 will be compensated for so as to allow the rod 80 to slidably move within the housing 84. When the hinge arm means 12 and seat back unit C are in a reclined position, the parts will have the relative positions shown in FIG. 8. Note that the pendulum lock 46 will still have its weight 137 disposed within the rightmost portions of the slot 104 in the lever means 22.

When the occupant no longer desires to have the seat back rest unit C in a reclined position, he will merely sit up to release the same from any backward pushing movement. When this occurs, the spring means 86 will cause the rod 80 to be moved toward the right, as viewed in FIG. 8, and to pivot the first lever means 22, the detent lever 24, the second lever means 36 in unison in a counterclockwise direction about the axis 14a of the pivot means 14 until the seat back unit C is in its normal upright position. The stop 88 on the rod 80 engages the right end of the housing 84, as viewed in FIG. 1, to limit the extent to which the rod 80 can be moved toward the right, which in turn defines the upright normal position for the seat back unit C. The compression spring 86 remains slightly compressed when the seat back unit C is in its normal upright position so that the lever 22 through the detent lever means 24 maintains a slight biasing force on the roller 26 in engagement with the lower hinge arm 13 so as to prevent rattling between the detent roller 26 and the lower hinge arm 13 during normal use of the vehicle. Note also that, during this movement, the pendulum 46 whose weight 137 remains in engagement with the lever means 22 at the rightmost end of the slots 104 merely pivots with the lever means 22 via gravity as the seat back unit is returned from a reclined position towards its normal upright position.

The inertia lock pendulum 46 of the locking mechanism A functions to prevent forward movement of the seat back rest C irrespective of its position when the vehicle is suddenly subjected to rapid deceleration forces exceeding a predetermined magnitude. As can be seen from FIG. 1, with the seat back unit in its normal upright position and the vehicle is subjected to rapid deceleration forces, the inertial lock pendulum 46 will be caused to pivot about its pivot means 134 and 136 in a clockwise direction so as to cause the weight 137 thereof to be moved from the rightmost end of the slots 104 to the leftmost end of the slots 104. When this occurs, the detent lever means 24 cannot be pivoted in a clockwise direction to release the roller means 26 from the recess 32 due to the fact that its projection 150 will engage the weight 137 and thus the seat back unit C is locked in its upright position until the vehicle is no longer experiencing rapid deceleration forces whereupon the inertia lock pendulum 46 by gravity will be caused to be pivoted in a counterclockwise direction about its pivot means 134 and 136 so as to move the weight 137 from the leftmost position within the slots 104 towards its rightmost position to clear the detent lever means 24 for movement. Likewise, it can be seen from FIGS. 7 and 8, should the seat back unit C be in its forward folded position or rearward reclined position the same type of movement will take place for the inertia lock pendulum 46 upon rapid deceleration force in excess of a predetermined magnitude being experienced on the vehicle and thus, it will serve to also lock the seat back unit C in either of the positions to which it is moved upon this condition occurring.

From the foregoing, it should be apparent that a novel locking mechanism for a seat assembly has been provided in which virtually all of the parts can be made from stamped sheet metal parts or planar members, the entire lock assembly is contained and located within the seat area B of the seat assembly, and that it has an overall width which takes up a minimum amount of space and that the hinge arm means (hinge arms 12 and 13) can be made relatively narrow and slim so as to provide a nice aesthetic appearance at the side of the seat and that the seat back recliner biasing means 44 will at all times maintains a spring biasing pressure between the roller 26 of the detent lever means 24 and the hinge arm 13 so as to prevent rattling between the detent roller 26 and the hinge arm 13. It should also be noted that the entire lock assembly, since it is located within the seat area at its side, can be readily covered up by a suitable cover 200 so that it is hidden from view so that the seat B when viewed from its side has a clean aesthetic view.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a seat assembly for an automotive vehicle having:
    a seat cushion supported on a seat frame means which is adapted to be mounted to vehicle support structure,
    a backrest including a side hinge arm means pivotally supported by said seat frame means for pivotal movement about a first pivot axis between a normal upright position in which the backrest is generally vertically disposed, a forward folded position in which the backrest overlies at least a portion of said seat cushion and a rearward reclined position,
    and a locking mechanism for releasably locking said backrest in either of its normal upright or folded positions, said locking mechanism comprising a first lever means pivotally supported by said seat frame means for movement in opposite directions about said first pivot axis, said hinge arm means at its lower end having first and second arcuately spaced recesses,
    a detent lever means pivotally connected to said first lever means intermediate its ends and carrying a roller means adjacent one end which is receivable within said first and second recesses in said hinge arm means to position the backrest in its upright and folded positions, respectively,
    a second lever means having one end pivotally connected to said first lever means and its other end engageable with said detent lever means adjacent its other end remote from the roller means,
    spring means for biasing said second lever means into engagement with said other end of the detent lever means to biasingly retain said roller means of said detent lever means in engagement with the lower end of said hinge arm means,
    said lower end of said hinge arm means when the latter is being moved between its upright and folded positions causing the detent lever means and second lever means to be moved in a direction in opposition to the biasing force of said spring means,
    said first lever means, hinge arm means, second lever means and detent lever means being movable in unison about said first pivot axis in response to manual movement of said backrest from its normal upright position to a reclined position, and with said roller means remaining disposed within said first recess, and recliner biasing means operatively connected with said first lever means to automatically move said first lever means, hinge arm means, second lever means and detent lever means about said first pivot axis in the opposite direction to automatically return said backrest from its reclined position toward its normal upright position when said back rest is manually released.

2. In a seat assembly for an automotive vehicle having a seat cushion supported on a seat frame means which is adapted to be mounted to vehicle support structure,
    a backrest pivotally supported by said seat frame means for pivotal movement about a first pivot axis between a normal upright position in which the backrest is generally vertically disposed and a forward folded position in which the backrest overlies at least a portion of said seat cushion and for pivotal movement about said first pivot axis between said normal upright position and a rearward reclined position, and a locking mechanism for releasably locking said back rest in either of its upright or folded positions, said locking mechanism comprising a support bracket secured with the seat frame means and a hinge arm means connected with said backrest and pivotally connected to said bracket via a first pivot means which defines said first pivot axis,
    a first lever means pivotally supported by said first pivot means for movement in opposite directions about said first pivot axis, said hinge arm means at its lower end having an arcuate surface concentric with said first pivot axis and having first and second arcuately spaced recesses in communication with said arcuate surface,
    a detent lever means pivotally connected to said first lever means intermediate its ends and carrying a roller means adjacent one end thereof which is receivable within said first and second recesses in said hinge arm means to position the backrest in its upright and folded positions, respectively, a second lever means having one end pivotally connected to said first lever means and its other end engageable with said detent lever means adjacent its other end remote from the roller means, spring means carried by said first pivot means and engageable with said second lever means intermediate its ends for biasing said other end of said second lever means into engagement with said other end of the detent lever means to biasingly retain said roller means of said detent lever means in engagement with the arcuate surface of the lower end of said hinge arm means, said lower end of said hinge arm means when the latter is being moved between its upright and folded positions respectively causing the roller means to be cammed outwardly of the first recess and the detent lever means and second lever means to be rotated in a direction in opposition to the biasing force of said spring means whereupon the roller means will roll on the arcuate surface until adjacent the second recess at which time the spring means will move the roller means into the second recess, recliner biasing means operatively connected to the first lever means adjacent its lower end remote from said first pivot axis for biasing said backrest toward its normal upright position, said first lever means, hinge arm means, second lever means and detent lever means being rotatable in unison about said first pivot axis in response to pushing backward movement on said backrest to a reclined position from its upright position in opposition to the biasing force of said recliner biasing means, said recliner biasing means returning said backrest from a reclined position to its normal upright position when the backrest is released and serving to biasingly hold the detent roller means in said first recess and in engagement with said hinge arm means to prevent rattling between said roller means and said hinge arm means.

3. In a seat assembly for an automotive vehicle having a seat cushion supported on a seat frame means which is adapted to be mounted to vehicle support structure, a backrest pivotally supported by said seat frame means for pivotal movement about a first pivot axis between a normal upright position in which the backrest is generally vertically disposed and a forward folded position in which the backrest overlies at least a portion of said seat cushion and for pivotal movement about said first pivot axis between said normal upright position and a rearward reclined position, and a locking mechanism for releasably locking said back rest in either of its upright or folded positions, said locking mechanism comprising a support bracket secured with the seat frame means and a hinge arm means pivotally connected with said backrest and connected to said bracket via a first pivot means which defines said first pivot axis, a first lever means pivotally supported by said first pivot means for movement in opposite directions about said first pivot axis, said hinge arm means at its lower end having an arcuate surface concentric with said first pivot axis and having first and second arcuately spaced recesses in communication with said arcuate surface, a detent lever means pivotally connected to said first lever means intermediate its ends and carrying a roller means adjacent one end thereof which is receivable within said first and second recesses in said hinge arm means to position the backrest in its upright and folded positions, respectively, a second lever means having one end pivotally connected to said first lever means and its other end engageable with said detent lever means adjacent its other end remote from the roller means, spring means carried by said first pivot means and engageable with said second lever means intermediate its ends for biasing said other end of said second lever means into engagement with said other end of the detent lever means to biasingly retain said roller means of said detent lever means in engagement with the arcuate surface of the lower end of said hinge arm means, said lower end of said hinge arm means when the latter is being moved between its upright and folded positions respectively causing the roller means to be cammed outwardly of the first recess and the detent lever means and second lever means to be rotated in a direction in opposition to the biasing force of said spring means whereupon the roller means will roll on the arcuate surface until adjacent the second recess at which time the spring means will move the roller means into the second recess, recliner biasing means operatively connected to the first lever means adjacent its lower end remote from said first pivot axis for biasing said backrest toward its normal upright position, said first lever means, hinge arm means, second lever means and detent lever means being rotatable in unison about said first pivot axis in response to pushing backward movement on said backrest to a reclined position from its upright position in opposition to the biasing force of said recliner biasing means, said recliner biasing means returning said backrest from a reclined position to its normal upright position when the backrest is released and serving to biasingly hold the detent roller means in said first recess and in engagement with said hinge arm means to prevent rattling between said roller means and said hinge arm means, and an inertia lock pendulum for locking said seat backrest in its upright position upon the vehicle being subjected to rapid deceleration forces, said pendulum comprising leg means having one end pivotally connected to said first lever means and its other end connected to a weight extending transversely thereof and which is disposed within an elongated slot means in said first lever means, said pendulum being swingable relative to said first lever means and being engageable with said detent lever means at its underside adjacent said one end thereof to prevent said roller means of said detent lever means from becoming dislodged from said first recess in said hinge arm means to lock the latter against forward movement and said back rest in its normal upright position when subjected to rapid deceleration forces acting on said vehicle.

4. In a seat assembly for an automotive vehicle, as defined in claims 1 or 2, and including an inertia lock pendulum for locking said seat backrest in its upright position upon the vehicle being subjected to rapid deceleration forces, said pendulum comprising leg means having one end pivotally connected to said first lever means and its other end connected to a weight extending transversely thereof and which is disposed within an elongated slot means in said first lever means, said pendulum being swingable relative to said first lever means and being engageable with said detent lever means at its underside adjacent said one end thereof to prevent said roller means of said detent lever means from becoming dislodged from said first recess in said hinge arm means to lock the latter against forward movement and said back rest in its normal upright position when subjected to rapid deceleration forces acting on said vehicle.

5. In a seat assembly for an automotive vehicle in accordance with claim 3 and wherein said bracket means, first lever means, hinge arm means, detent lever means, second lever means and said leg means of said pendulum are all made from stamped sheet metal parts to provide a compact narrow width locking mechanism.

6. In a seat assembly in accordance with claim 5 and wherein all the parts of the locking mechanism are wholly located in the seat cushion area to provide a compact and narrow width locking mechanism.

7. In a seat assembly in accordance with claim 6 and wherein the entire locking mechanism can be assembled as a subassembly and readily secured to the seat frame means of said seat cushion unit.

* * * * *